(12) United States Patent
Hayes

(10) Patent No.: US 6,364,140 B1
(45) Date of Patent: Apr. 2, 2002

(54) SHELF SUPPORTING SYSTEM

(76) Inventor: Lowell Hayes, P. O. Box 727, Valle Crucis, NC (US) 28691

( * ) Notice: Subject to any disclaimer, the term of this patent is extended or adjusted under 35 U.S.C. 154(b) by 0 days.

(21) Appl. No.: 09/725,217

(22) Filed: Nov. 29, 2000

Related U.S. Application Data

(60) Provisional application No. 60/209,609, filed on Jun. 6, 2000.

(51) Int. Cl.⁷ .............................................. A47B 43/00
(52) U.S. Cl. ...................................................... 211/188
(58) Field of Search ................................ 211/188, 194, 211/184, 43, 11; 108/60, 61

(56) References Cited

U.S. PATENT DOCUMENTS

| | | | |
|---|---|---|---|
| 2,112,498 A | * | 3/1938 | Lax |
| 2,366,677 A | * | 1/1945 | Rosenthal |
| 2,820,684 A | * | 1/1958 | Zadek et al. |
| 3,872,976 A | * | 3/1975 | Moore et al. |
| 4,485,930 A | * | 12/1984 | Savelkouls |
| 4,525,882 A | * | 7/1985 | Stenberg |
| 4,685,574 A | * | 8/1987 | Young et al. |
| 5,199,584 A | * | 4/1993 | Fowler |

* cited by examiner

Primary Examiner—Alvin Chin-Shue
Assistant Examiner—Sarah Purol
(74) Attorney, Agent, or Firm—Richard L Huff

(57) ABSTRACT

A shelf system in which shelf boards are separated by base units and partition units. Each base unit and partition unit comprises a back piece and a centrally located perpendicular piece. The back piece is rectangular in shape and has a centrally located "T"-shaped male connecting piece on the front and back surfaces for connecting with the perpendicular piece and the locking channel piece. The perpendicular piece is rectangular in shape and has a first end containing a "T"-shaped female connecting groove for connecting with the connecting piece of the back piece. The perpendicular piece contains a second end containing a "T"-shaped male connecting piece for connecting with a locking channel piece. The perpendicular piece and the back piece of the base have keepers at the bottom thereof to prevent the locking channel piece from touching the supporting surface. The locking channel piece is a longitudinal rectangular strip having a "T"-shaped female connecting groove for connecting with the back piece and the perpendicular piece. A multiplicity of base units containing the back piece and the perpendicular piece may be placed as desired on a supporting surface. A shelf board is then placed on top of the base units. Perpendicular units and additional shelf boards are placed on top of the lowest shelf board until the desired shelf unit is in place. The locking channel pieces are then slid into place along the aligned back pieces and perpendicular pieces to unite the shelving unit and hold the pieces in place.

10 Claims, 4 Drawing Sheets

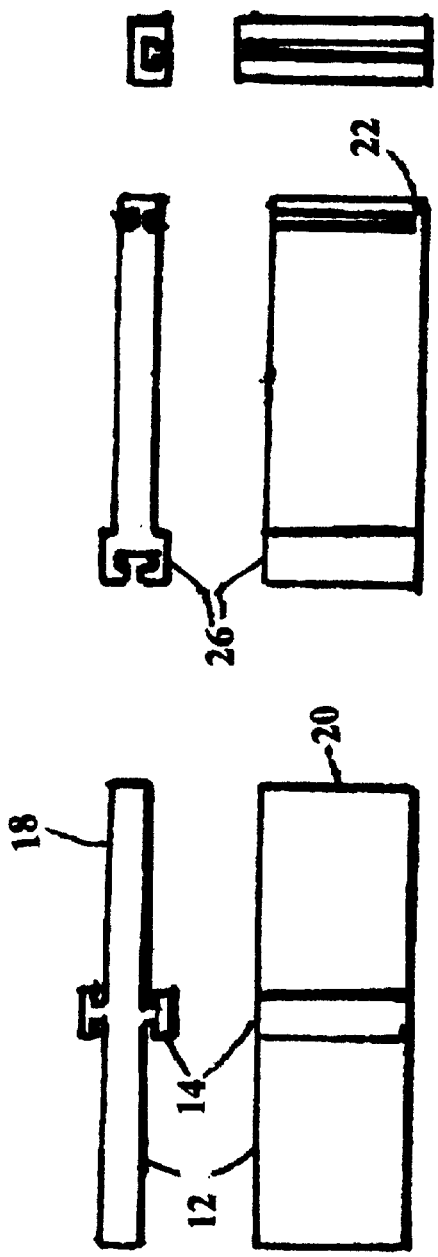
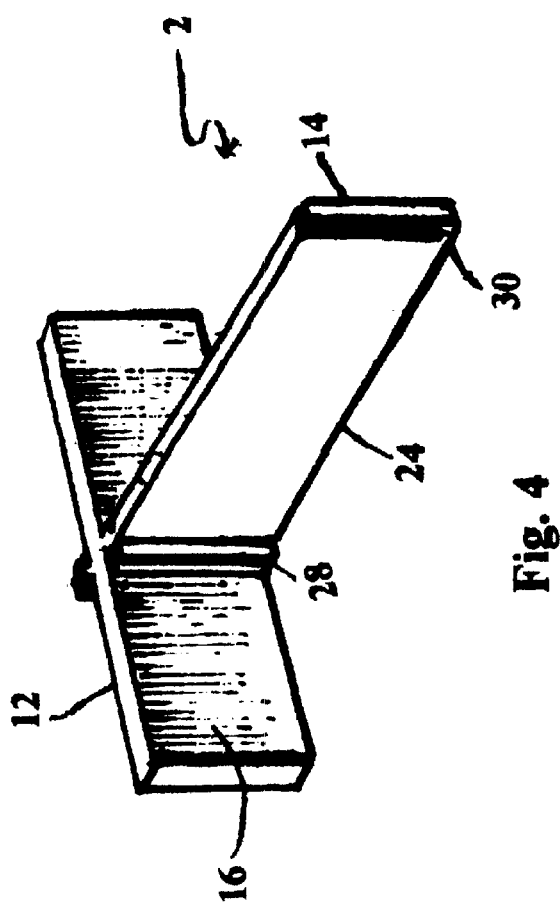

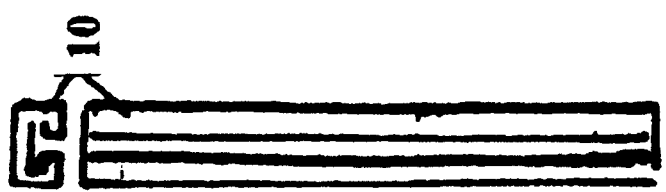
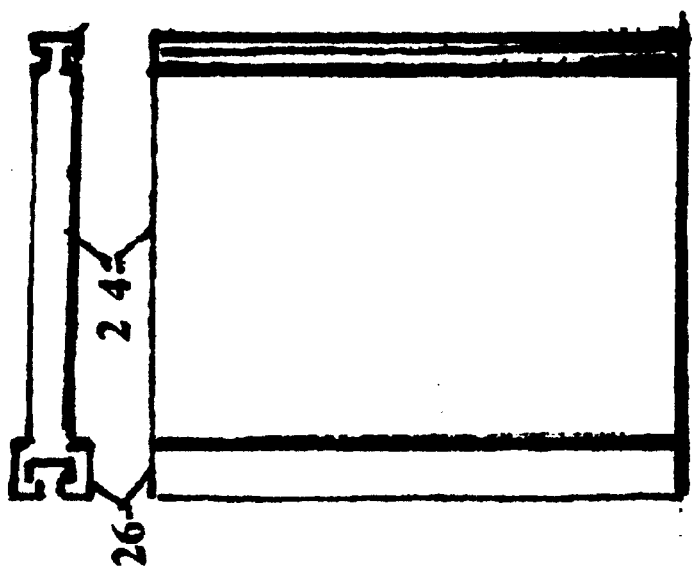
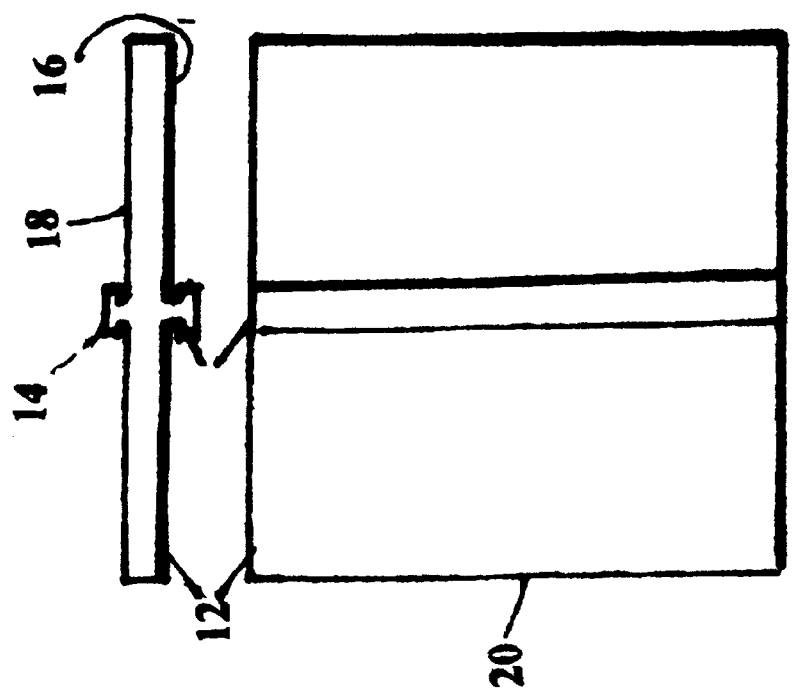
Fig. 7
Fig. 6
Fig. 5

SHELF SUPPORTING SYSTEM

CROSS-REFERENCE TO EARLIER APPLICATION

This application claims the benefit of U.S. Provisional Application No. 60/209,609, filed Jun. 6, 2000.

BACKGROUND OF THE INVENTION

1. Field of the Invention

This invention relates to a free-standing shelf support system which is versatile, easy to install, inexpensive, simple in design, and sturdy.

2. Description of the Related Art

Systems to support shelves and to keep them vertically aligned and separated from each other are well known in the art. U.S. Pat. No. 3,693,556 to Rous shows "T"-shaped vertical risers, cross members extending between the risers, and trays suspended from the cross members to form shelves. These units are made of pieces having complicated shapes, leading to expensive manufacturing processing. U.S. Pat. No. 4,125,338, issued to Lew, discloses a system in which each shelf board and each partition contains a hole capable of accepting the arms of a cross in order to keep the partitions and shelves in a constant fixed relationship. Additionally, each shelf and each partition contains rail-like protrusions which fit into grooves of connecting bars to provide a sturdy connection. The user of this system is limited to boards which come with the supporting units or else must prepare holes for the cross using accurate measurements.

SUMMARY OF THE INVENTION

The present invention is drawn to a system for supporting shelves. With the use of this system, no tools are required in the assembly of a series of shelves. The system is versatile, being capable of use with shelves having a variety of lengths and vertical spacings. This system is safe strong, inexpensive to manufacture, and easy to use. The shelf boards and the support system need not be purchased as a unit.

The system of the present invention is made up of a series of units which may be placed under and over the shelf boards in order to secure the boards. Each unit comprises a back, a partition, and locking channel pieces fitted in such a way as to create a rigid perpendicular partition with one edge of the partition being in contact with a locking channel piece.

Understanding of this invention will be enhanced by reference to the following drawing wherein like reference numerals will refer to like elements throughout the following description.

BRIEF DESCRIPTION OF THE DRAWING

FIG. 1 is a top and side view of the back piece of a base unit.

FIG. 2 is a top and side view of the perpendicular piece of a base unit.

FIG. 3 is a top and side view of the locking channel piece of a base unit.

FIG. 4 is an elevational perspective view of an assembled base unit.

FIG. 5 is a top and side view of the back piece of a partition unit.

FIG. 6 is a top and side view of the perpendicular piece of a partition unit.

FIG. 7 is a top and side view of the locking channel piece of a partition unit.

DESCRIPTION OF THE PREFERRED EMBODIMENTS

Figure 8:
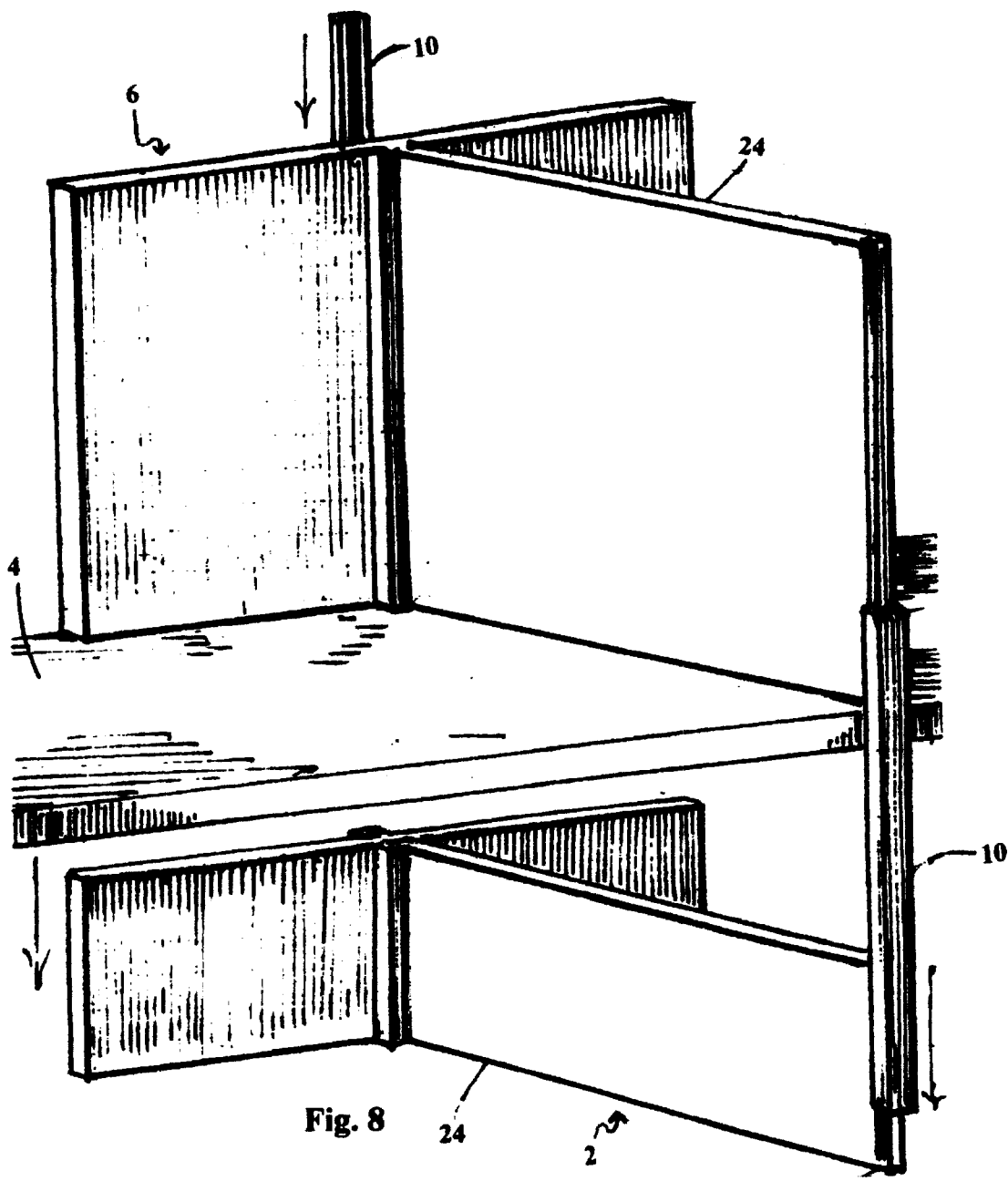
FIG. 8 is an elevational perspective view of a base unit, partition unit, and a shelf board in relative position during assembly.

There are two types of units in the present invention. The first, the base unit 2, rests upon a supporting surface (not shown), usually a floor, and supports the bottom shelf 4. This unit 2 is approximately four inches in height. The second, the partition unit 6, rests upon a lower shelf 4 and supports a higher shelf 8. This unit 6 can be made of pieces of varying heights from a standard eight inches to twelve inches or higher. The units 2 6 may be manufactured from plastic, such as polypropylene or polyethylene, wood, or composite. The locking channel pieces 10 of the units may also be manufactured from metal.

Referring to FIGS. 1 and 5, the back piece 12 of the base 2 and partition 6 units is generally rectangular in shape, having a "T"-shaped male connecting piece 14 protruding from the front 16 and rear 18 of the back piece 12 about equidistant from each end 20. One of the "T"-shaped male connecting pieces 14 of the back piece 12 has a keeper 22 at the bottom to prevent the co-operating locking channel piece 10 from touching the supporting surface.

Referring to FIGS. 2 and 6, the perpendicular piece 24 of the base 2 and partition 6 units is generally rectangular in shape, having a "T"-shaped female connecting slot 26 at a first end 28 for connecting with the corresponding male connecting piece 14 of the back piece 12. At the second end 30 of the perpendicular piece 24, there is a "T"-shaped male connecting piece 14 for connecting with the locking channel pieces 10. The perpendicular piece 24 of the base unit 2 has a keeper 22 at the bottom of the second end 30 to prevent the co-operating locking channel piece 10 from touching the supporting surface.

Referring to FIGS. 3 and 7, the locking channel piece 10 is a generally longitudinal rectangular strip, having a "T"-shaped slot 26 for connecting with the corresponding second end 30 of the perpendicular piece 24.

While the back piece 12 has been illustrated as having a male connecting piece 14 and the locking channel piece 10 has been illustrated as having a female connecting slot 26, there is nothing critical in this arrangement, and any pattern is suitable for the purposes of this invention.

The back 12 and perpendicular pieces 24 of the base units 2 may be quickly and easily assembled by simply sliding the "T"-shaped male connecting piece 14 of the back piece 12 into the "T"-shaped female connecting slot 26 of the partition units 6. The finished unit 2 will appear as in FIG. 4. The desired number of base units 2 may be put into place and lower shelf boards 4 placed over them.

Figure 9:
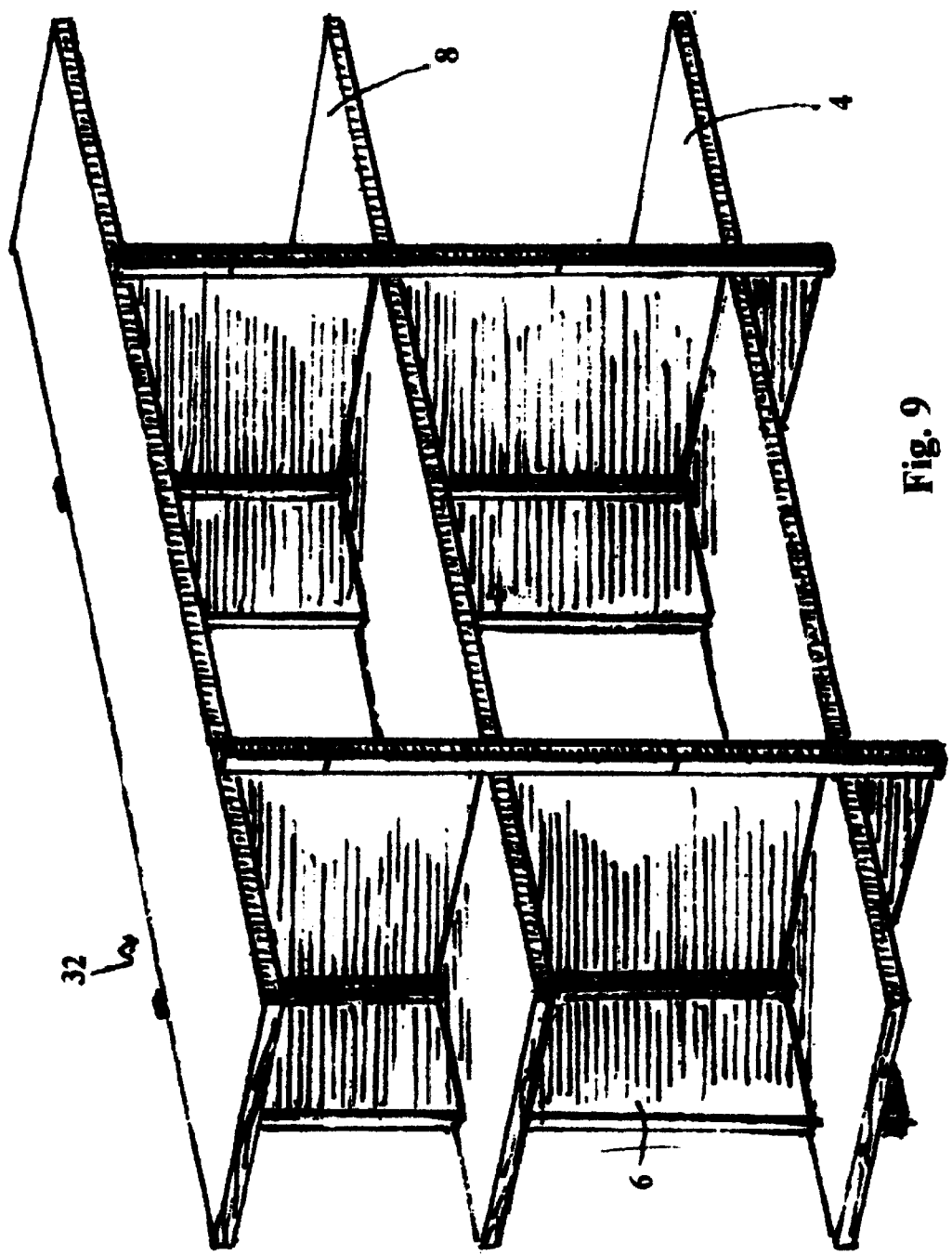
FIG. 9 is an elevational perspective view of an assembled shelf using the shelf support system of this invention.

The desired number of partition units 6 may then be placed on the lower shelf board directly 4 over the base units 2. A series of shelf boards 8 and partition units 6 may be thus stacked as desired, ending with a shelf board 8 on top. Locking channel pieces 10 are then slipped over the free "T"-shaped male connecting pieces 14 of the back pieces 12 and the perpendicular pieces 24 as shown in FIG. 8 to produce a shelf unit 32 as shown in FIG. 9. Short locking channel pieces 10 of varying lengths are available so that the finished shelf unit 32 will have locking channel pieces 10 which come to the top of the top shelf but do not extend beyond the top.

The shelf units 32 of this invention generally stand on the floor, but are suitable for standing on desks or tables. While the standard shelf units 32 will be suitable for holding books, the shelf units may be so sized as to be suitable for holding cassettes, files, etc.

Although the invention has been described and illustrated in detail, it is to be clearly understood that the same is by way of illustration and example, and is not to be taken by way of limitation.

I claim:

1. A system for use in supporting shelves on a supporting surface, comprising a plurality of base units and partition units, each unit comprising (A) a back piece having ends and front and rear sides and (B) a perpendicular piece having front and rear edges; the back piece having a vertically oriented connecting pieces protruding from each of the front and rear sides; the perpendicular piece having a vertically oriented connecting piece protruding from each of the front and rear edges; the connecting pieces of the front side of the back piece and the rear edge of the perpendicular piece being so shaped as to interlock with each other; said system additionally containing a plurality of longitudinal strips containing vertically oriented connecting pieces, the connecting pieces of the rear side of the back piece and the front edge of the perpendicular piece being so shaped as to interlock with the longitudinal strips.

2. The system of claim 1 wherein each of the connecting piece protruding from the rear side of the back piece and the connecting piece protruding from the front edge of the perpendicular piece of the base contains a keeper to prevent the longitudinal strips from touching the supporting surface.

3. The system of claim 1 wherein the connecting pieces protruding from the front and rear sides of the back piece are about equidistant from the ends of the back piece.

4. The system of claim 1 wherein the connecting pieces are "T"-shaped male connecting pieces and "T"-shaped female connecting slots.

5. The system of claim 4 wherein the connecting piece protruding from the front and rear sides of the back piece and the connecting piece protruding from the front edge of the perpendicular piece are "T"-shaped male connecting pieces and the connecting pieces of the rear edge of the perpendicular piece and the longitudinal strips are "T"-shaped female slots.

6. A shelf system comprising, from bottom to top, (1) a plurality of base units, each base unit comprising a back piece having ends and front and rear sides and a perpendicular piece comprising front and rear edges, the back piece having a vertically oriented connecting piece protruding from each of the front and rear sides; the perpendicular piece having a vertically oriented connecting piece protruding from each of the front and rear edges; the connecting pieces of the front side of the back piece and the rear edge of the perpendicular piece being so shaped as to interlock with each other; (2) a lower shelf resting on the base units; (3) a plurality of partition units resting on the lower shelf directly above corresponding base units, each partition unit comprising a back piece having ends and front and rear sides and a perpendicular piece comprising front and rear edges, the back piece having a vertically oriented connecting piece protruding from each of the front and rear sides; the perpendicular piece having a vertically oriented connecting piece protruding from each of the front and rear edges; the connecting pieces of the front side of the back piece and the rear edge of the perpendicular piece being so shaped as to interlock with each other; (4) additional shelves and partition units so arranged that a shelf is on the top; and (5) said system additionally containing a plurality of longitudinal strips containing vertically oriented connecting pieces, the connecting pieces of the rear side of the back piece and the front edge of the perpendicular piece being so shaped as to interlock with the longitudinal strips.

7. The shelf system of claim 6 wherein each of the connecting piece protruding from the rear side of the back piece and the connecting piece protruding from the front edge of the perpendicular piece of the base contains a keeper to prevent the longitudinal strips from touching the supporting surface.

8. The shelf system of claim 6 wherein the connecting pieces protruding from the front and rear sides of the back piece are about equidistant from the ends of the back piece.

9. The shelf system of claim 6 wherein the connecting pieces are "T"-shaped male connecting pieces and "T"-shaped female connecting slots.

10. The shelf system of claim 9 wherein the connecting piece protruding from the front and rear sides of the back piece and the connecting piece protruding from the front edge of the perpendicular piece are "T"-shaped male connecting pieces and the connecting pieces of the rear edge of the perpendicular piece and the longitudinal strips are "T"-shaped female slots.

\* \* \* \* \*